United States Patent [19]
Dybro et al.

[11] Patent Number: 5,529,258
[45] Date of Patent: Jun. 25, 1996

[54] SECONDARY LOCKING MECHANISM FOR RETRACTOR WITH PRETENSIONER

[75] Inventors: Niels Dybro, Utica; Harold J. Miller, III, Troy, both of Mich.

[73] Assignee: AlliedSignal Inc., Morristown, N.J.

[21] Appl. No.: 363,095

[22] Filed: Dec. 21, 1994

[51] Int. Cl.⁶ .................................................. B60R 22/46
[52] U.S. Cl. ............................................................ 242/374
[58] Field of Search ........................... 242/374; 280/806; 297/476, 477, 478, 480

[56] References Cited

U.S. PATENT DOCUMENTS

| | | | |
|---|---|---|---|
| 3,970,266 | 7/1976 | Doin et al. | 242/374 |
| 4,455,000 | 6/1984 | Nilsson | 242/374 |

Primary Examiner—John M. Jillions
Attorney, Agent, or Firm—Markell Seitzman

[57] ABSTRACT

A safety device comprising: a retractor (22) for protracting and rewinding a safety belt to be worn about an occupant, having a lock wheel (42) and an associated lock pawl (74) movable into engagement therewith upon sensing an emergency condition by a sensing mechanism (50); a pretensioner for rotating the spool in a belt winding direction and a rotary element (80) for converting pretensioner motion to rotary motion and a spring loaded mechanism for providing for locking readiness of the lock pawl and operable after activation of and during rotation of the spool in the belt winding direction. Each of the frame sides includes a positioning hole or opening 70a and 70b through which the tie bar 72 of the present invention extends. If the retractor uses two lock wheels, two such lock pawls would be used.

5 Claims, 4 Drawing Sheets

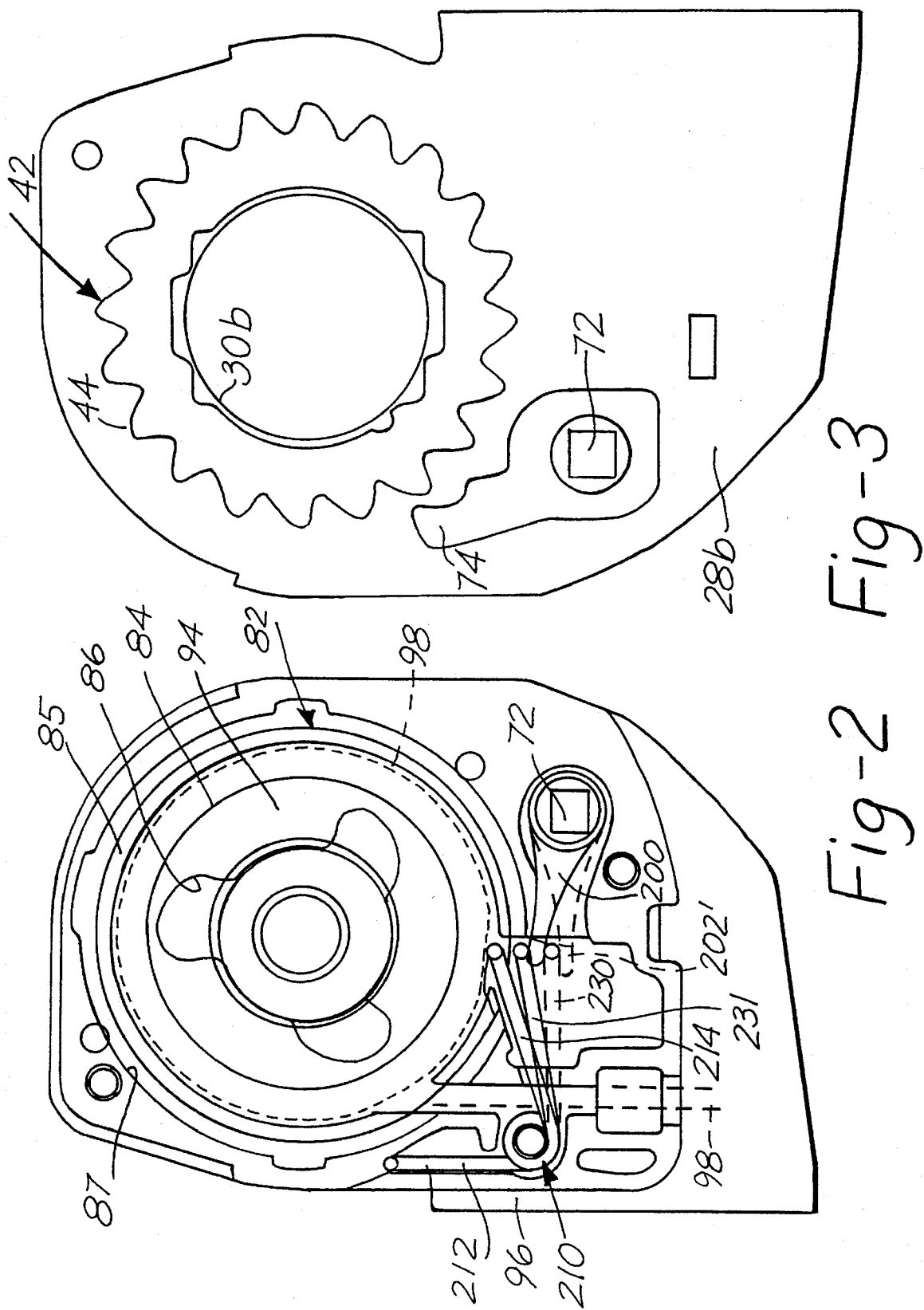

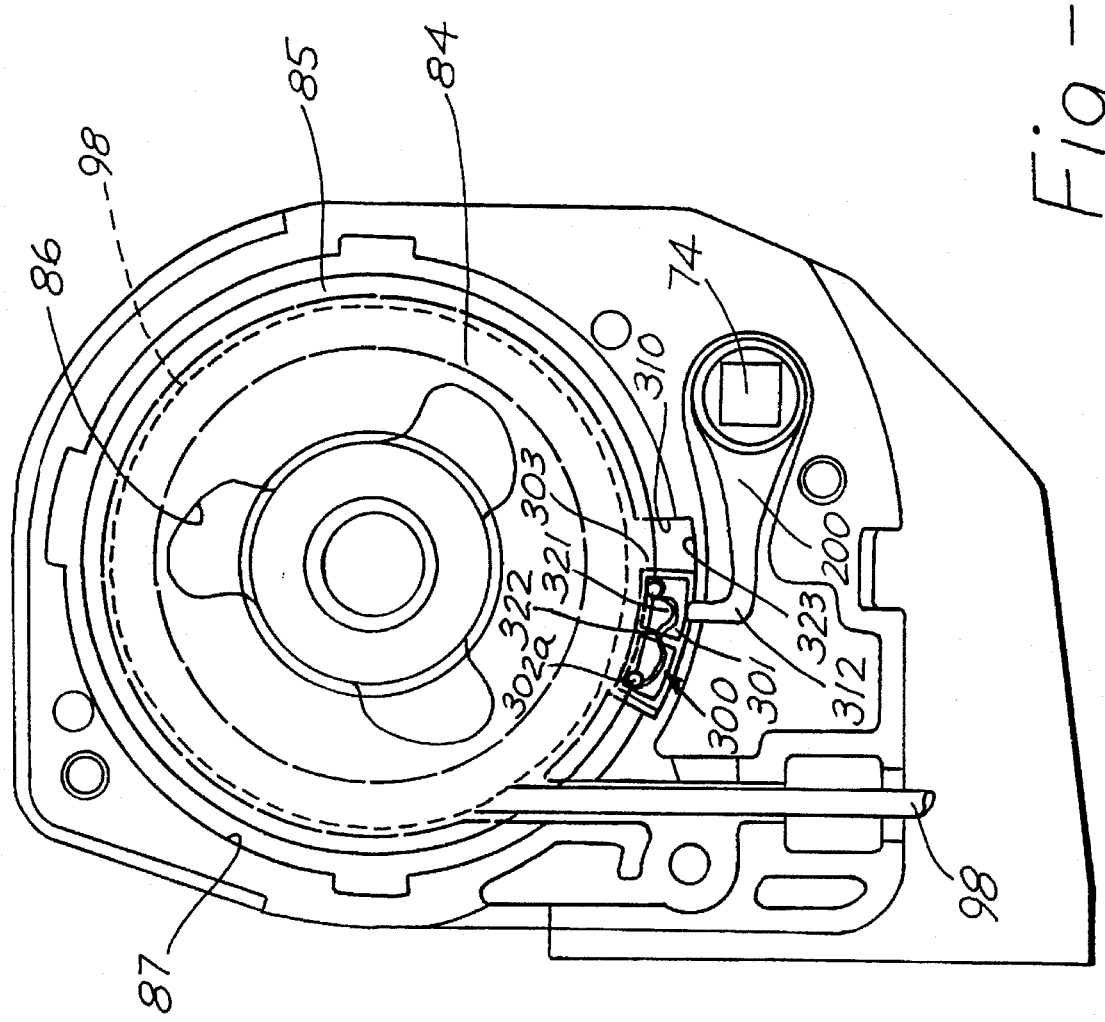

SECONDARY LOCKING MECHANISM FOR RETRACTOR WITH PRETENSIONER

BACKGROUND AND SUMMARY OF THE INVENTION

The present invention generally relates to retractors and pretensioners for seat belts and more particularly to an apparatus that enhances the ability of the retractor to quickly and positively lock subsequent to pretensioner activation.

Emergency locking (ELR) seat belt retractors include a sensing mechanism typically using both a vehicle and web sensor to initiate the lock up of the retractor during an emergency situation such as during a severe brake maneuver or during a collision. Pretensioners are now used to reduce or eliminate slack in the seat belt and typically the shoulder (torso) belt, however, the pretensioner is only activated in a severe collision. Pretensioners typically use springs or pyrotechnic elements to apply forces to the seat belt. A clutch or rotary hub or wheel converts the linearly acting pretensioner force to a rotary force to forcibly reverse rotate the spool and in so doing remove slack about the occupant. After the slack is removed the retractor spool must again be locked extremely quickly to prevent the protraction of the seat belt due to the inertial loads applied thereto by the occupant as the occupant is driven forward in reaction to the deceleration of the vehicle. During the time that the spool is reverse wound by action of the pretensioner a lock dog or lock pawl typically associated with the vehicle sensor, ratchets over closely spaced lock teeth of the spool. A typical pretensioner removes the slack in the seat belt in less than 10 milliseconds and imparts an extremely high rotational torque and acceleration to the spool. As the spool moves rapidly past the lock dog (lock pawl) the lock dog not only ratchets over the teeth but may also begin to bounce about the teeth. The significance of this bouncing is that the lock dog may not be in the desired position to rapidly lock the spool to prevent protraction of the seat belt upon being loaded by the occupant. The present invention provides a means for positioning a lock pawl or lock dog relative to the lock teeth and insures a rapid lock up.

It is an object of the present invention to provide an improved safety device. An additional object of the invention is to provide a device in which rapid lock up of the retractor is insured after pretensioner operation.

Accordingly the invention comprises: a safety device comprising: a retractor for protracting and rewinding a safety belt to be worn about an occupant, having a lock wheel and an associated lock pawl movable into engagement therewith upon sensing an emergency condition, a sensing mechanism for initiating lock up during certain operational conditions; pretensioner means for winding the spool in a belt winding direction, including a pretensioner and clutch means for converting pretensioner motion to rotary motion. The retractor further includes locking readiness means for providing a secondary mechanism for maintaining the lock pawl in locking readiness to lock against the lock wheel after pretensioner activation and the rotation of the spool in the belt winding direction due to occupant loading. This locking readiness means includes, in one embodiment, a rotatable tie bar wherein the lock pawl is mounted to and rotatable with the tie bar; and activation means for selectively biasing the tie bar subsequent to pretensioner activation in a direction to move the lock pawl against the lock wheel. Various means of biasing the tie bar are disclosed. In an alternate embodiment a secondary lever is used to directly activate a part of a vehicle sensor which biases the sensor into activation thereby moving the lock pawl towards a position of engagement with the lock wheel.

Many other objects and purposes of the invention will be clear from the following detailed description of the drawings.

BRIEF DESCRIPTION OF THE DRAWINGS

In the drawings:

FIG. 2 further illustrates a plan side view of the retractor taken along lines 2—2 of FIG. 1 and showing an improvement provided by the present invention.

FIG. 3 illustrates a plan side view of the retractor taken along lines 3—3 of FIG. 1 showing the interaction between a lock pawl and locking wheel.

FIG. 6 illustrates a side view of an additional embodiment of the invention.

DETAILED DESCRIPTION OF THE DRAWINGS

Figure 1:
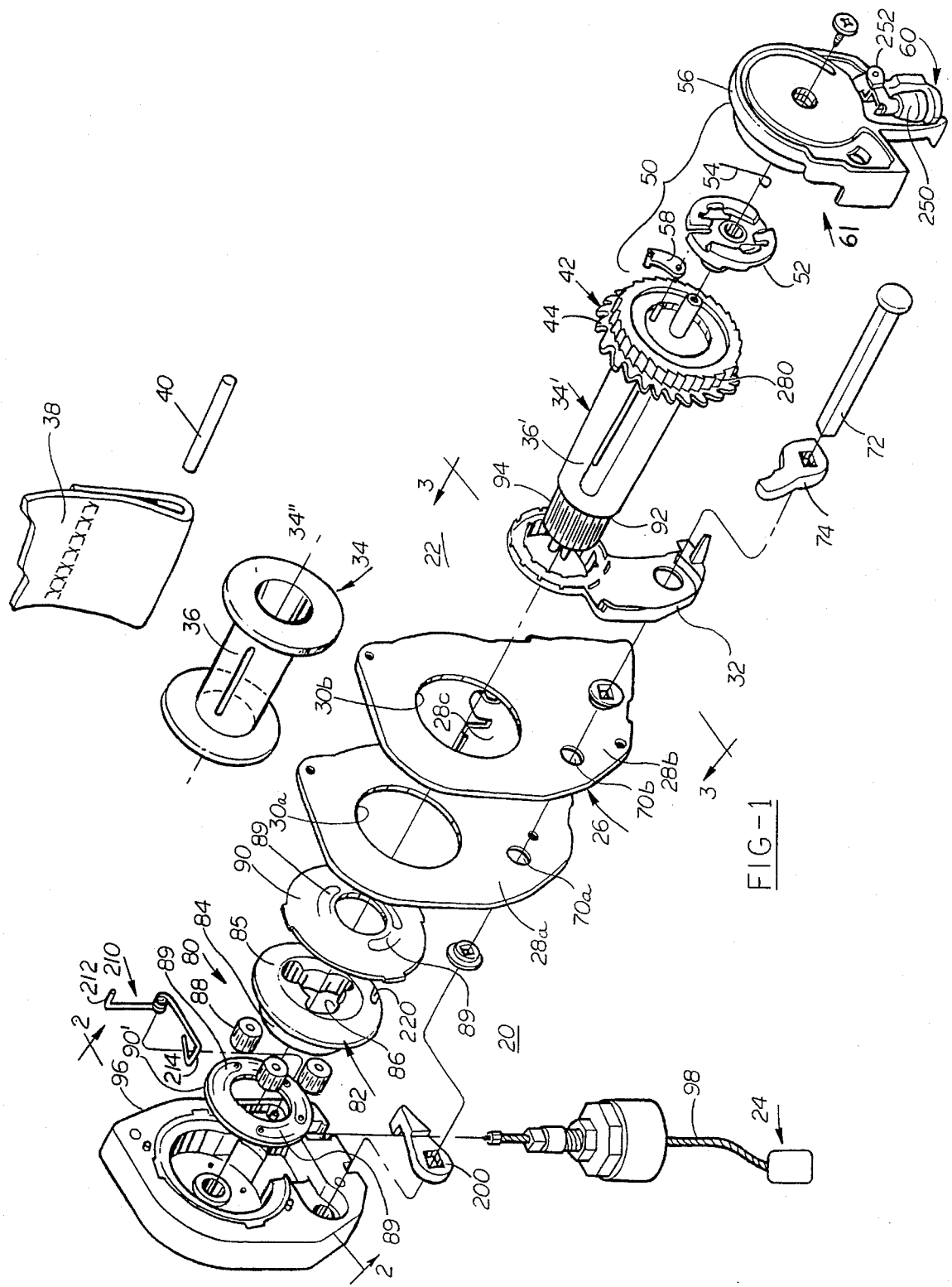
FIG. 1 shows an exploded view a safety device incorporating the present invention.

The following is a general description of the safety device 20 shown in FIG. 1. The device 20 comprises a seat belt retractor 22 and a pyrotechnic pretensioner mechanism 24. As with many retractors this retractor 22 includes a U-shaped frame 26 having sides 28a and 28b and a connector piece 28c. Both sides include an opening 30a and 30b. A bushing 32, provided by a plastic plate, butts against side 28b to provide a low friction surface against which a spool may rotate. The spool 34 comprises a shaft 34' and belt receiving flanged bobbin 34" having a center part 36 about which seat belt webbing 38 is wound. The shaft is inserted into a bore in the bobbin 34". While the shaft 34' and bobbin are shown as two parts they can be and often are integral. In the following description the shaft and bobbin 34" are referred to as the spool 34. A webbing pin 40 is received within a looped end of the webbing and secured within the center part of the spool in a known manner. The spool 34 additionally includes a lock wheel 42 (on a sensor or mechanism side of the retractor) having a plurality of locking teeth 44 and an integrally formed ratchet wheel 280 having a second set of teeth that interacts with a sensor pawl 252. A separate toothed ratchet wheel could also be substituted for the integral wheel. The retractor can also be fitted with an additional set of locking teeth positioned on an opposite side of the spool if it is to function as a dual locking retractor. Fitted to the lock wheel side of the spool is a sensing mechanism 50 comprising a vehicle sensor 60 and a web sensor 61 of known type. The vehicle and web sensor of the type shown coact, that is, use and share certain structural components. The sensing mechanism 50 could of course be formed using an independently acting web sensor and vehicle sensor. In this case the vehicle sensor might include an inertial element such as a pendulum acting to move a rotatably mounted lock bar into the teeth of the lock wheel. Either the coacting or independent type of sensor construction is usable with the present invention. The structure of the coacting type of sensing mechanism 50, shown in FIG. 1, need not be discussed in any detail as they are known in the art. The web sensor 61 includes an inertia mass 52, a calibration spring 54 and internal teeth (not shown) formed in a cavity of the lock cup 56. The sensing mechanism 50 additionally includes a sensing pawl 58 that engages these teeth on an inner diameter of the lock cup 56 in a known manner to link the cup with the spool. Suspended from the lock cup 56 is the vehicle inertial sensor 60. In the embodiment shown the vehicle sensor comprises a standing man 250 having an associated vehicle sensing pawl 252 that is moved upward into engagement with the ratchet wheel 280. The lock cup 56 includes an edge moved against a lock pawl 74 to move same against the lock teeth 44. This type of sensing mechanism operates by phasing the movement of the various sensor parts to move the lock pawl 74 into locking engagement with the lock teeth 42. As is known in the art the web sensor causes the lock up of a spool when the webbing is protracted at an excessive rate. The vehicle sensor also causes the locking up of the spool upon sensing a deceleration also in excess of a predetermined rate. One such sensing mechanism 50 is shown in European Patent document EP 0228729 which is incorporated herein by reference. Upon activation of this type of exemplary sensing mechanism 50 the lock cup 56 is physically coupled to and rotates with the shaft. This rotation moves the edge 270 into contact with the lock pawl 74 moving same into engagement with the lock wheel 42. In the prior art typical lock pawls such as that illustrated in the above patent are rotatably mounted on a fixedly mounted tie bar that spans the frame sides or directly linked to a side of the retractor frame.

Fitted to the frame opposite the sensing mechanism is the pyrotechnic mechanism such as a pretensioner 24 of known variety and an associated optional clutch generally shown as 80. The pretensioner may included a tube, a pyrotechnic charge and a piston that is driven down the tube by the gases produced by the charge. The clutch comprises an inner shim 90 against a clutch plate 82 having a single extending rim 85 and narrow drum 84 received in a cavity 87 shaped to receive the rim and drum in the clutch housing. Positioned interior to the drum and a part thereof is a clover leaf shape cut out 86. One of a plurality of rollers 88 extends into one of the plurality of lobes of the cut out 86. The rollers are held in place by a like plurality of plastic spring fingers 89 formed as part of the inner shim and an outer shim 90 and 90'. The fingers hold the rollers out of engagement with a knurled or toothed part 94 of the spool until the clutch is activated. Extending from the knurled part is a fork that receives one end of a rewind spring (not shown), the other end of which is attached to the frame in a known manner. Also covers may be provided to protect the various parts of the device 20. Optionally, the rollers may be held in place by a roller cage (not shown). This knurled or toothed portion 94 is received within the cloverleaf opening 86 and selectively engaged by the clutch rollers 88 when the clutch drum starts rotating. The above mentioned clutch parts are received within a cavity of a clutch housing generally shown as 96. Extending from the pyrotechnic mechanism 24 is a steel cable that is wrapped about the clutch drum and when pulled outwardly causes a relative rotation of the clutch drum. The movement of the drum moves the rollers inwardly into locking engagement with the toothed portion 94. Thereafter, the retractor spool is forcibly and rapidly rotated in a belt winding direction to reduce or remove a predetermined amount of slack within the seat belt, that is, the slack in the seat belt of the occupant. The above mentioned seat belt can be either one or both of the lap and/or shoulder belt. As can be appreciated the clutch per se can be removed and the cable 98 coiled about a drum part attached to the spool.

Reference is now made to FIG. 2 which illustrates in greater detail the improvements of the present invention. In the present invention the tie bar or connecting axle 72 has a square cross section to provide a keyed interlock with a rotatable lever generally shown by numeral 200 positioned in a housing such as the clutch housing. The tie bar extends through openings 70a and 70b in the frame and is supported by bushings in the openings 70a,b therein to permit the tie bar to rotate. The lever 200 is received within a cut out in the clutch housing and pivots with the tie bar from a first position generally shown by solid lines 202 to a second position 202' shown by phantom line. Further the clutch housing includes another cut out to permit installation of an activation spring 210 having a first end 212 entrapped within the clutch housing and a second or moving activation end 214 received within and captured by a groove or hook 220 formed within the rim 85 of a drum such as the clutch drum 84. The cable 98 is captured between the clutch housing and the rim and extends about the clutch drum. The knurled or toothed end 94 of the spool 34 is also shown in FIG. 2.

During the normal operation of the present invention the actuation end of the actuator spring is keyed to and locked within the hook or opening 220 of the clutch drum rim 85. Reference is now made to FIG. 3 which illustrates a plan view of the lock wheel side of the retractor. The central opening 30b within frame side 28b is similarly shown. An opposite end of the square tie bar 72 extends through the lock pawl 74, via a square opening therein so that the tie bar and lock pawl rotate together. As can be appreciated the square tie bar provides communication between the actuator lever 200 and the lock pawl 74. During normal operation, not involving pretensioner activation, that is, when the lock pawl is moved into and out of engagement with a lock wheel due to the operation of the vehicle sensor or web sensor, the actuation lever 200 simply follows this motion (via communication through the tie bar) moving from the first position 202 to its second position 202'. As can be seen the actuator lever 200 is free to move within the clearance space provided within the clutch housing and does not inhibit the action of the primary locking pawl.

During a severe accident the lock pawl 74 is moved to lock the retractor to prevent protraction of the seat belt and upon the actuation of the pretensioner 24 the cable 98 is withdrawn from the clutch housing causing the clutch drum 84 to rotate in a counter clockwise direction as viewed in FIG. 2. This rotation of the clutch drum relative to the spring end 214 causes the disengagement of the actuator spring end 214 from its the opening, tab or cutout 220 formed on the clutch drum 84. Upon release of the end 214 of the actuator spring 210 such spring end rapidly expands and moves downward (its downward position shown in phantom line and generally indicated by numeral 230). The motion of the spring 214 will urge the lever 200 down (if it is away from position 202'). This applied torque and resulting motion of the lever 200 is communicated through the tie bar to forcibly move the locking pawl 74. As can be seen from the above, this torque acts directly upon the lock pawl 74 forcibly rotating the lock pawl in a clockwise direction as viewed in FIG. 2 maintaining the lock pawl in engagement with the closely spaced teeth 44 of the lock wheel 42 even as the lock pawl ratchets over the teeth as the spool is reverse wound by the pretensioner. As the lock pawl moves over the teeth 44 its position relative to the frame changes slightly as it moves over the outer contour of the teeth. This motion is communicated to the lever 200 which moves against the bias of spring 210. An intermediate position of the lever 200 and spring 210 is shown as 231.

In view of the above it can be seen that during the initial moments of the operation of the pretensioner the spool is reverse rotated (i.e. in a counter clockwise direction as shown in FIG. 3) in a belt winding direction to remove slack while the activation spring 210 forces the lock pawl against the lock wheel 42. One face or side of each of the locking teeth 44 is curved or sloped to permit the lock pawl to ratchet over the individual teeth during the time that the pretensioner is causing the counter rotation of the spool.

The operation of the pretensioner generates a certain amount of reactive force that is exerted on the seat belt opposing the motion or potential motion of the occupant in a forward direction due to the accident. The level of reactive force or tension created on the seat belt is dependent in part on the intensity and distance though which the pretensioner pulls the cable outwardly from the clutch housing. In any case, the properly designed pretensioner will remove a sufficient amount of webbing and create a relatively large reactive force on the seat belt forcing the occupant firmly into the seat. However, at some point in the interval of operation of the pretension/retractor the forces imparted to the seat belt by the occupant will exceed those residual forces remaining on the cable (i.e. the webbing due to the operation of the pretensioner). If nothing else is done to restrain the moving parts of the pretensioner, the cable, the clutch or the spool the occupant will move forward, as the vehicle slows, eliminating the benefit provided by the pretension. That will not happen in the present case because prior to the completion of operation of the pretensioner and prior to generation of excessive occupant loading on the belt the lock pawl 74 has already been brought into a readiness condition to engage the locking wheel. As mentioned above, during the initial operation of the pretensioner, with the spool being reverse rotated, the lock pawl only ratchets about the lock wheel as any bouncing of the lock pawl is prevented by the spring bias provided by spring 210, lever 200 and tie bar 74. As the force generated on the webbing by the occupant exceeds the pretensioner forces the spool will tend to rotate in a belt unwinding i.e. counter clockwise direction. This motion is immediately halted since the lock pawl has already been brought into locking readiness through the actuator spring 210 permitting the lock pawl to lock with the next available tooth locking the spool 34.

Figure 4:
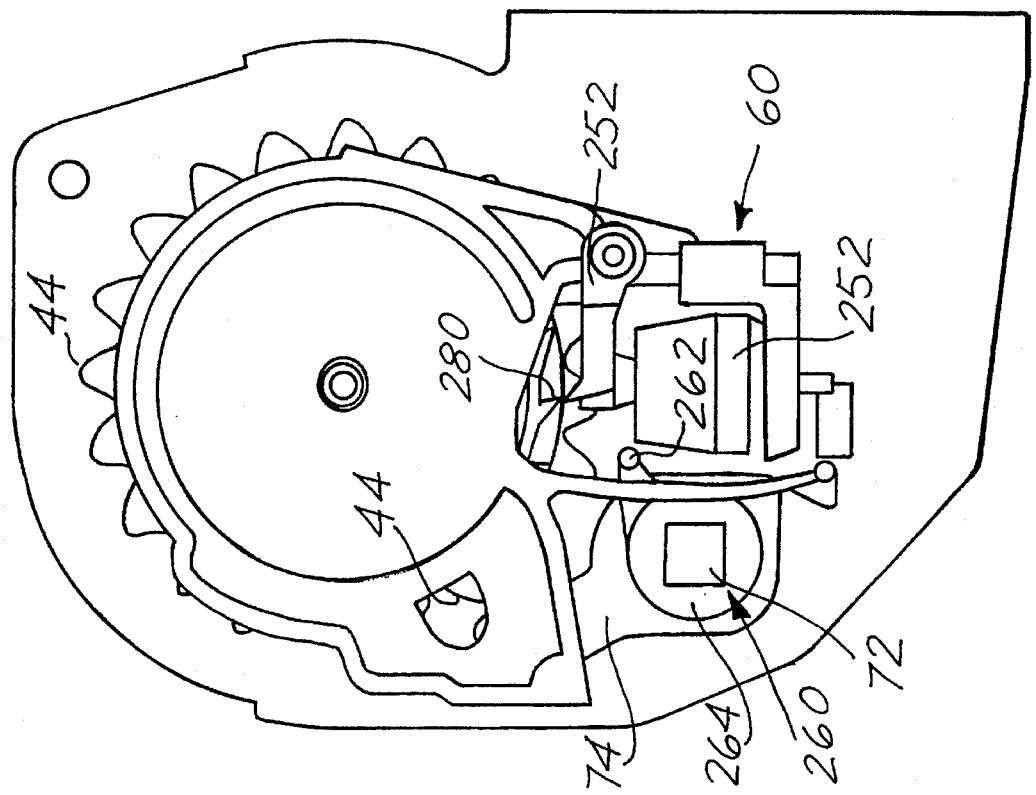

The above embodiment is usable with vehicle sensors having a lock bar moved by an inertial mass associated with an independent vehicle sensor or a vehicle sensor that coacts with a web sensor and illustrated in FIG. 1. The second embodiment finds utility with a coacting type of sensor mechanism that generates a phased movement of the lock pawl 74 in response to the motion of the lock cup 56. This phased movement is initiated by the movement of one of the sensors to cause rotation of a flock cup. Reference is now made to FIG. 4 which illustrates a plan view of the sensor mechanism side of the retractor and shows in greater detail the features of the lock cup 56 and vehicle sensor 60 comprising the standing man 250 and associated sensing pawl 252. In this embodiment of the invention the locking pawl 74 is not rotated by the tie bar but is rotatably mounted about a secondary activation pawl 260. This pawl includes a circular body 264 and an activation finger 262 that extends from and is part of the circular body 264. The body 264 is keyed to and rotates with tie bar 72 (as did the lock pawl of the earlier embodiment) and is directly moved by the activation spring 214 in a manner that the lock pawl 74 was moved. The lock pawl 74 is rotatably mounted about the circular body which acts as a support bushing. As also mentioned above, when either of the web or vehicle sensor is activated the lock cup 56 is or becomes coupled to the rotation of the shaft and rotates therewith. This rotary motion of the lock cup and its edge 270 rotates the lock pawl 74 about the tie bar and secondary pawl 260 into engagement with the locking teeth thereby halting rotation of the retractor. Activation of the pretensioner causes jerking forces which cause high acceleration of various components. When these accelerations are superimposed with vehicle deceleration the net acceleration can at some time momentarily become zero which will permit the mass of the vehicle sensor to move to its rest position causing disengagement of certain the lock pawls and lock wheels. This embodiment eliminates this potential effect.

Figure 5:
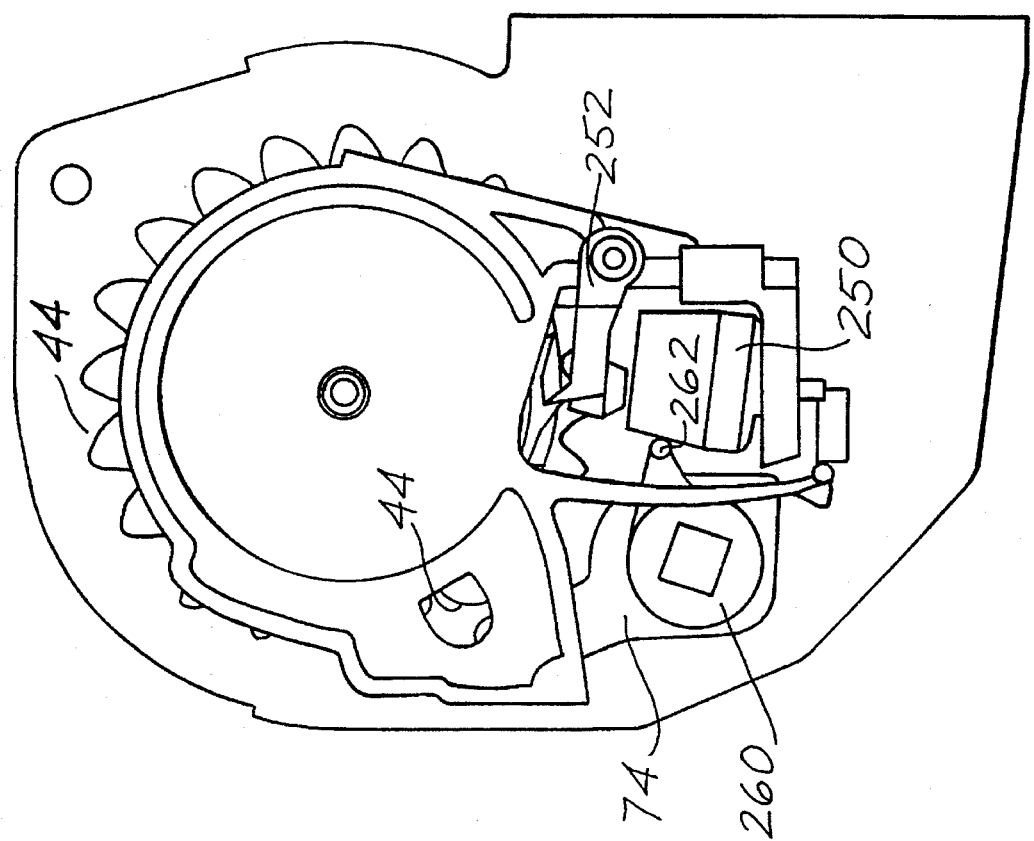
FIGS. 4 and 5 illustrate side plan views of another embodiment of the invention.

In this second embodiment of the invention upon activation of the pretensioner, the actuator spring 210 is released from slot 220 within the clutch drum as happened in the earlier embodiment. Thereafter the lever 200 rotates the tie bar 72 which in turn forcibly rotates the activation pawl or lever 260 in a clockwise direction as viewed in FIG. 4. FIG. 5 shows the activation pawl 260 rotated in a clockwise direction into an engagement with the walls of the vehicle sensor mass 250. This engagement between the finger 262 of lever 260 with the vehicle sensor mass 250 causes the vehicle sensor mass to tip over and maintains it in a tipped condition (as it would be upon sensing a high vehicle deceleration) as shown which in turn lifts the sensing pawl 252 (or keeps it in a lifted position) into engagement with teeth of a ratchet wheel 280. This forced biased motion of the activation pawl maintains the lock cup in proper communication with the spool and maintains the lock pawl 74 in positioned to engage the lock wheel as the seat belt is later loaded by the occupant. It should be appreciated that the extending arm or finger 262 of the lever 260 can directly engage a surface of the sensing pawl 252 moving same into engagement with the ratchet wheel 280.

Reference is briefly made to FIG. 6 which illustrates a further embodiment of the invention and shows an additional way of biasing the lever 200. This embodiment utilizes a caged leaf spring 300 having at least one extending lobe 301 that is supported on a cage 303 having upward extending pins 302a and 302b receiving ends of the spring. The cage 303 is initially coupled to the underside of the clutch drum 85 outboard of the coiled cable 98, by these pins which as shown below break away. Outward radial movement of the cage is prevented by a wall 323 formed in the clutch housing. Upon activation of the pretensioner the clutch drum rotates in a counter clockwise manner as viewed in FIG. 6 carrying with it the cage 303 and the leaf spring 300 towards a stop 310 formed as part of the wall 323 in the clutch housing. As the clutch rim and leaf spring 300 rotate in the counter clockwise direction, the lever 200 which now includes an inwardly extending arm 312 is forced downward as the arm follows the profile of the lobes 321 of the moving leaf spring. In essence the motion of the leaf spring and its shape provide a torque or driving force to the lever 200 rotating the lever 200, tie bar 72 and hence the locking pawl 74 into engagement with the teeth 44 of the lock wheel in a manner virtually identical to that achieved in the embodiment described in the two embodiments above. This alternate spring action can be used with either of the above two embodiments. Upon activation of the pretensioner and movement of the cable 98 the clutch wheel rotates in a counter clockwise direction as shown in FIG. 5. As the clutch rotates the cage 303 is carried with it and causes the activating lever arm 312 to move outwardly following the profile of the leaf spring. As the drum 84 rotates sufficiently the cage 303 contacts the mechanical stop 300 at which time the break-away pins 301a and 301b are sheered off. Simultaneously therewith, the arm 312 is captured by the center groove 322 formed between the lobes 321 of the leaf spring 300. As can be appreciated the leaf spring 300 replaces the spring 210 shown in the earlier embodiment and as mentioned provides an alternate means of forcibly rotating the lever 200 and tie bar 72 or activation pawl 260.

Many changes and modifications in the above described embodiment of the invention can come of course, be carried out without departing from the scope thereof. Accordingly, that scope is intended limited only by the scope of the amended claims.

We claim:

1. A safety device comprising:

a retractor (22) for protracting and rewinding a safety belt to be worn about an occupant, having a lock wheel (42) and an associated lock pawl (74) movable into engagement therewith upon sensing an emergency condition by a sensing mechanism (50);

pretensioner means for causing the spool to be wound in a belt winding direction, including a pretensioner (24);

locking readiness means for providing a secondary mechanism for maintaining the lock pawl in locking readiness to lock against the lock wheel after activation and during and after rotation of the spool in the belt winding direction, including a rotatable tie bar (72) wherein the lock pawl (74) is mounted to and rotatable with the tie bar; activation means (220, 210) for selectively biasing the tie bar subsequent to pretensioner activation in a direction to move the lock pawl against the lock wheel; including spring means (210) in a housing (80) selectively engagable with a lever (200) to urge the tie bar in a direction to move the lock pawl.

2. The device as defined in claim 1 wherein the spring means includes a coiled spring having an arm (214) movable against the lever.

3. The device as defined in claim 2 wherein the pretensioner means includes a drum having a notch (220) on a rim portion thereof and wherein the spring arm is held in the notch and released therefrom upon rotation of the drum.

4. A safety device comprising:

a retractor (22) for protracting and rewinding a safety belt to be worn about an occupant, having a lock wheel (42) and an associated lock pawl (74) movable into engagement therewith upon sensing an emergency condition by a sensing mechanism (50);

pretensioner means for causing the spool to be wound in a belt winding direction, including a pretensioner (24) and a rotatable drum;

locking readiness means for providing a secondary mechanism for maintaining the lock pawl in locking readiness to lock against the lock wheel after activation and during and after rotation of the spool in the belt winding direction, including a rotatable tie bar (72) wherein the lock pawl (74) is mounted to and rotatable with the tie bar; activation means (220, 210) for selectively biasing the tie bar subsequent to pretensioner activation in a direction to move the lock pawl against the lock wheel; wherein the activation means includes a rotatable spring cage (303) fitted to the drum and movable with the rotation of a drum upon activation of the pretensioner means, the cage mounted on the drum via break-away tabs which break away after the cage and drum have rotated a predetermined amount, an arcuately shaped spring carried by the cage, a rotary lever (200, 312) linked to the tie bar and moved by the arcuate spring as the spring is moved therepast.

5. A safety device comprising:

a retractor (22) for protracting and rewinding a safety belt to be worn about an occupant, having a lock wheel (42) and an associated lock pawl (74) movable in engagement therewith upon sensing an emergency condition by a sensing mechanism (50);

pretensioner means for causing the spool to be wound in a belt winding direction, including a pretensioner (24);

locking readiness means for providing a secondary mechanism for maintaining the lock pawl into locking readiness to lock against the lock wheel after activation and during and after rotation of the spool in the belt winding direction, wherein the locking readiness means includes a rotatable tie bar (72) and a secondary pawl (260) rotatable therewith, the lock pawl (74) rotatably mounted about the tie bar and movable into engagement with the lock wheel in response to activation of the sensing mechanism, wherein the secondary pawl (260) is movable into engagement with the sensing mechanism to cause one of a) the sensing mechanism to remain in an activated position and b) the sensing mechanism to enter an activated position thereby maintaining the lock pawl in locking engagement with the lock wheel.

* * * * *